Figure 1A:
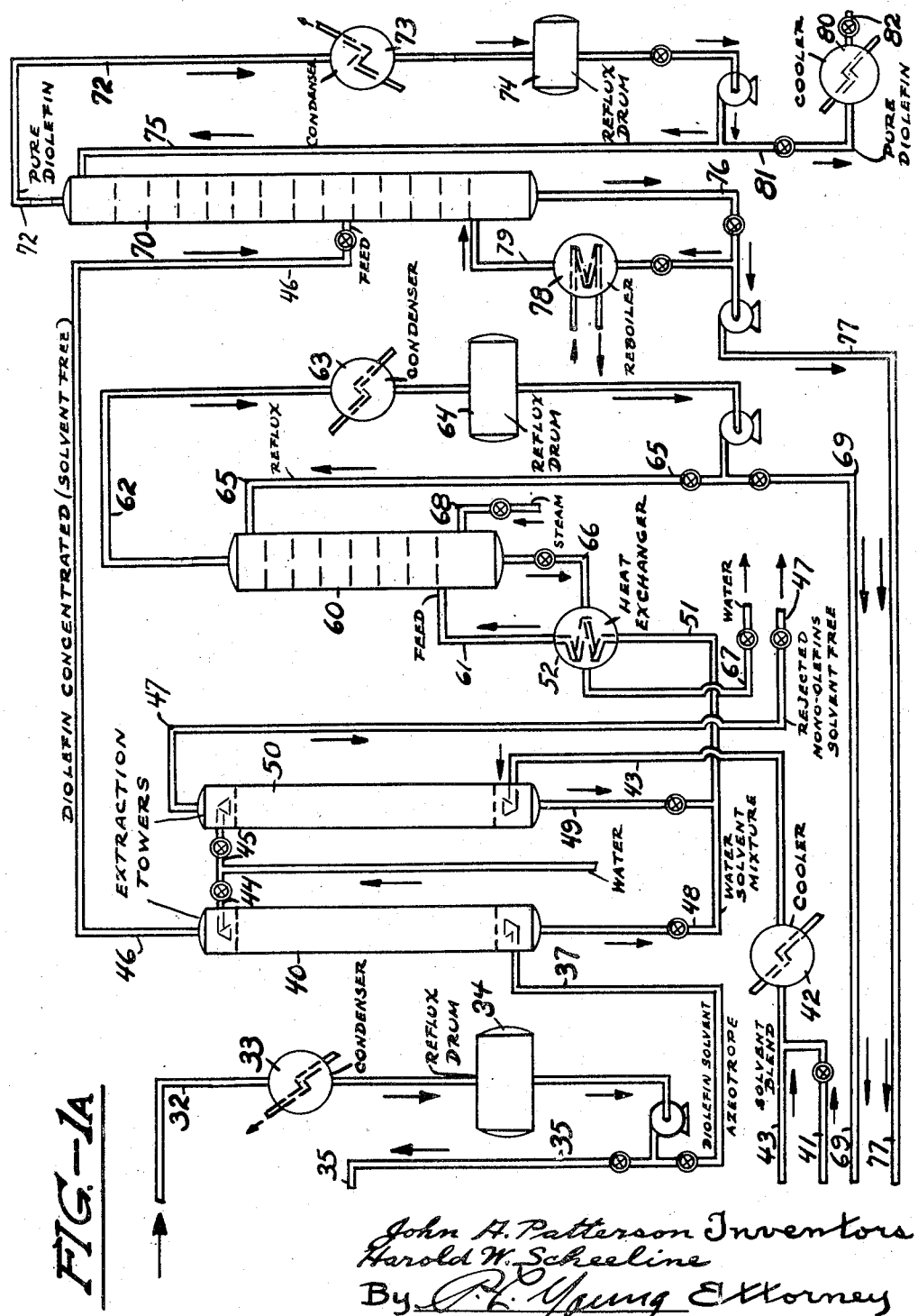

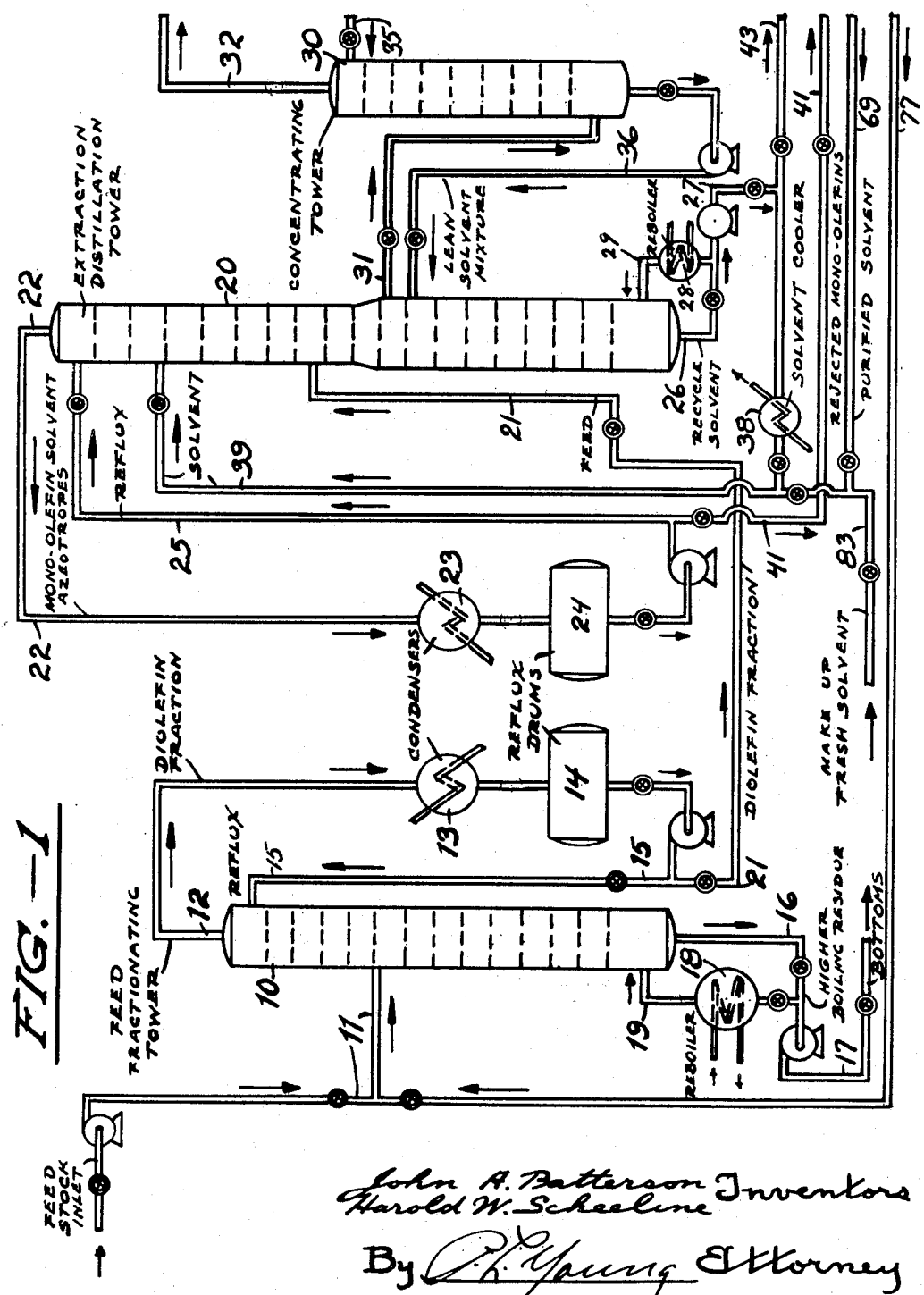

Patented Sept. 2, 1947

2,426,705

UNITED STATES PATENT OFFICE 2,426,705

RECOVERY OF ISOPRENE BY FRACTIONATION AND EXTRACTIVE DISTILLATION

John A. Patterson, Westfield, and Harold W. Scheeline, Elizabeth, N. J., assignors to Standard Oil Development Company, a corporation of Delaware Application December 29, 1942, Serial No. 470,426

2 Claims. (Cl. 202—39.5)

This invention relates to the treatment of mixtures of hydrocarbons of above the $C_3$ range to effect the separation and purification of paraffins, mono-olefins, and diolefins. The invention relates particularly to the separation of diolefins containing 5 carbon atoms in the molecule from their admixture with other hydrocarbons in products of the treatment of petroleum fractions; and also to the purification of diolefins.

An object of this invention is to provide an improved method for concentrating isoprene from a mixture of hydrocarbons of 5 carbon atoms containing also pentenes, including 2-methyl butene-2 and cyclopentene, such as that obtained by cracking a petroleum oil, in which the hydrocarbon mixture is first distilled to produce a distillate fraction substantially free of cyclopentene but containing 2-methyl butene-2 and other pentenes, and this distillate is then subjected to extractive distillation in the presence of a volatility modifying solvent to effect separation of the pentenes as a distillate fraction from isoprene. This isoprene is then separated from the solvent, which is recycled to the upper part of the extractive distillation zone.

In the drawing, Figures 1 and 1A, taken together, constitute a diagrammatic showing of one embodiment of our process.

From the various refining processes for the preparation of motor fuels, highly volatile liquid by-products are obtained. These liquid by-products are today of great commercial importance. Many of these liquid by-products are mixtures of low molecular-weight hydrocarbons, and as such are difficult to resolve into useful mixtures by the ordinary processes of fractional distillation. Thus, for hydrocarbons containing 5 carbon atoms in the molecule the boiling points at 760 mm. are:

| | ° C. |
|---|---|
| 3-methyl butene-1 | 21.2 |
| Pentene-1 | 30.2 |
| 2-methyl butene-1 | 31.1 |
| Isoprene | 34.1 |
| Trans pentene-2 | 35.9 |
| n-pentane | 36.0 |
| Cis pentene-2 | 37.0 |
| 2-methyl butene-2 | 38.4 |
| Cyclopentadiene | 41.0 |
| Trans piperylene | 41.9 |
| Cis piperylene | 43.9 |
| Cyclopentene | 44.1 |
| Cyclopentane | 49.5 |

It is to be noted that the boiling points of the various types of compounds in the tabulation do not follow the degree of chemical saturation of the compounds. This is particularly noteworthy since highly complex mixtures of the $C_5$ hydrocarbons are commonly produced in large volumes as by-products from refinery cracking units. Extremely expensive fractionation equipment would be needed in order to effect the segregation of an individual constituent. Furthermore, if a fractional distillation is made upon such cracking-coil by-products at extremely high reflux ratios to obtain very narrow fractions, prolonged heating of the mixture is involved; and, as a result, considerable polymerization of the more unsaturated compounds commonly occurs. Thus, fractional distillation alone as a means for separating very narrow fractions from such mixtures is disadvantageous.

It has now been found that such complex mixtures may be advantageously resolved into their individual constituents by a unique combination of processing steps. This invention involves at least three such processing steps. In two of the three steps fractional distillation is employed. Between the two fractional distillation steps is effected an extractive distillation. The process of the invention is thus the combination of a carefully controlled fractional distillation of a suitable feed stock, followed by an extractive distillation of a particular distillate fraction, and then subsequently fractionally distilling one of the particular distillate fractions from the extractive distillation operation. The process of the invention therefore resides not only in the combination of fractional distillation steps with extractive distillation, but in the particular manner of combination in order to achieve particularly desirable fractions for the second and the third steps in the processing—namely, for the extractive distillation and the second fractional distillation steps. It is usual, also, in commercial operation to employ a fourth step—namely, the recovery of the solvent employed in the extractive distillation step. Such a step is however incidental rather than an essential feature of the process of the invention.

In order to appreciate the invention, an understanding of the basis of each step is advantageous. In fractional distillation separation of the constituents of a mixture is made upon the basis of differences, at varying temperatures, of the vapor pressures of the various compounds when in admixture one with the other. In extractive distillation, on the other hand, separation of constituents is based upon differences at different temperatures of the vapor pressures of selected groups of compounds in the presence of certain type liquids added to a fractional distillation system.

The presence of suitable liquids in an extractive distillation affects in different degrees positive deviations from Raoult's Law, that is, the volatilities of the various compounds are greater in the presence of the added liquid than would be expected based upon their normal vapor pressures. Thus, in the case of a hydrocarbon mixture containing paraffins, mono-olefins, and diolefins, the added liquid modifies the relative volatilities of the various type hydrocarbons in such a way that in a narrow boiling fraction the paraffins will be the most volatile constituent; the mono-olefins, less volatile; and the diolefins, the least volatile. It is such an effect of an added liquid under suitable conditions of pressure and of concentration of the added liquid that contributes to the formation of azeotropic compositions. In extractive distillation, however, as distinct from azeotropic distillation—the added liquid is employed in substantially greater amounts in order to exert the maximum effect upon certain groups of compounds. The amount of added liquid employed in an extractive distillation is greatly in excess of that which would form with the mixture as a whole azeotropic mixtures of the constituents thereof. Thus, the addition of the extraneous liquid in extractive distillation is related to—but very distinct from—the addition of a definite amount of the added liquid in an azeotropic distillation system.

Liquids suitable in the extractive distillation step are in general the stable organic liquids of high dielectric constant. In other words, suitable materials are the normally liquid polar organic compounds containing oxygen, nitrogen, sulfur, and related elements. Suitable liquids also have the following characteristics:

1. High solubility for the hydrocarbons;
2. Marked effect on relative volatility;
3. Readily separable from the hydrocarbons by distillation or when azeotropes are formed by solvent extraction, or other means;
4. Sufficient volatility to permit stripping without requiring the use of high temperatures;
5. Chemical stability when heated in the presence of hydrocarbons;
6. Commercial availability and non-corrosiveness.

In the case of the separation of the $C_5$ hydrocarbons from their admixture with other hydrocarbons, acetone, furfural, pyridine, the amines, and their admixtures with water, have been found to be particularly advantageous.

Taking the separation of isoprene as a suitable example of the process of the invention, the first step involves the careful fractionation in multiple-plate distillation equipment of a narrow $C_5$ hydrocarbon fraction containing a substantial amount of isoprene; and, rejecting as much as possible of the piperylene, cyclopentadiene, and pentenes. A suitable source for isoprene is the refinery by-product distillate from the high temperature cracking of gas oil, virgin naphtha, kerosene, and/or other suitable feed stocks. A typical debutanized stock from this source may contain about 4% isoprene.

A distillate of this nature is first carefully fractionated in a multi-plate distillation tower so as to derive therefrom as overhead material a close boiling $C_5$ fraction containing essentially paraffins, mono-olefins, and diolefins; and, as a distillation residue, hydrocarbons of higher boiling points of $C_5$ to $C_9$ molecular content. In the first fractional distillation step, separation is thus made of a distillate containing as high a content of isoprene as is consistent with the feed stock from the distillation residue containing a substantial quantity of the higher boiling $C_5$ hydrocarbons in association with hydrocarbons of $C_5+$ molecular content. It is to be recognized that cyclopentadiene forms azeotropes with the pentanes and therefore in the separation of the $C_5$ hydrocarbons, if cyclopentadiene is not separated in the first fractionating tower, separation from isoprene until the final purification step may thus be difficult.

The close boiling overhead fraction is then carefully distilled in the presence of an excess of an organic liquid which affects in different degrees the relative volatilities of the various type hydrocarbons. For this purpose acetone, furfural, the liquid basic nitrogen compounds such as pyridine and the amines—and mixtures thereof with water are suitable. In the case of acetone the amount of aqueous acetone employed is usually about twice the volume of the liquid hydrocarbon mixture flowing down through the tower; while in the case of furfural the ratio is often as high as 7 to 1.

Thus, under suitably controlled conditions in the presence of such quantities of added liquid, such as aqueous acetone, a vapor overhead product is obtained which consists essentially of paraffins and mono-olefins of $C_5$ molecular content. The distillation residue which is normally obtained consists essentially of solvent which is recycled to the proper point in the tower to maintain as high a solvent to hydrocarbon ratio as is advantageous for the process. The most important fraction removed from the system is the intermediate distillate material conveniently termed the side-stream product. This side-stream product consists mainly of isoprene with such quantities of piperylene and cyclopentadiene as were present in the feed and such traces of liquid polymer products as were formed during the distillation operations. Both the overhead and side-stream distillate fractions may contain substantial quantities of the added liquid—that is, aqueous acetone in this case—as a result of the formation of azeotropic mixtures.

The side-stream product from the extractive distillation operation is normally treated to effect the separation of the liquid added in the extractive distillation operation. When aqueous acetone is employed as the added liquid, the side-stream product is usually countercurrently treated with water to remove the acetone, and thus to permit the isoprene and other hydrocarbons to be separated therefrom. The hydrocarbon material after the separation of the added liquid is then fractionally distilled under carefully controlled conditions to obtain as an overhead product one of the hydrocarbons in substantial purity. In the present case the fractional distillation is effected to obtain substantially pure isoprene as the overhead product; and to leave as distillation residue piperylenes, the cyclopentadiene not previously removed due to the presence in the system of pentanes, and smaller quantities of other impurities.

Since some polymerization—particularly of cyclopentadiene—commonly occurs during the extractive distillation step, high-boiling polymeric materials are normally present in the solvent recycle. In order to maintain the polymer content of the solvent at a low value, usually about 5% of the recycle solvent stock is removed and combined with the overhead distillate obtained from the extractive distillation; and the combined stream is then treated for solvent recovery.

In order to illustrate the invention more clearly, the following detailed description of processing is presented. The reference numerals given in the description refer to the accompanying drawings which present a suitable lay-out of equipment, and indicates a suitable flow of materials for processing according to the invention. In this illustration, example will be taken of the separation and purification of isoprene as obtained from the treatment of a debutanized distillate stream from a liquid phase cracking of a virgin gas oil stock. A specific example of a typical debutanized distillate stream has the following molar percentage composition:

| | |
|---|---|
| Butenes | 0.5 |
| 3-methyl butene-1 | 0.5 |
| Pentene-1 | 9.4 |
| 2-methyl butene-1 | 2.0 |
| Isoprene | 4.1 |
| Trans pentene-2 | 1.0 |
| N-pentane | 0.8 |
| Cis pentene-2 | 1.0 |
| 2-methyl butene-2 | 2.2 |
| Cyclopentadiene | 1.3 |
| Trans piperylene } Cis piperylene | 2.9 |
| Cyclopentene | 2.1 |
| Cyclopentane | 0.1 |
| C$_6$ | 11.7 |
| C$_6$ aromatics | 11.7 |
| C$_7$ | 18.7 |
| C$_8$ | 9.8 |
| C$_9$ | 20.2 |

The feed stock is supplied to fractionating equipment 10 through line 11. The fractionating equipment 10 may be of any of the usual types, such as a fractionating tower containing bubble plates. The equipment is operated usually at about atmospheric or somewhat above atmospheric pressure. In the diagram, equipment 10 is specifically shown as being a tower of multiplate construction containing bubble cap plates. In normal operation of processing according to the invention, about 50 plates are present in such a tower. The tower is shown as being complete with an overhead vapor line 12, a condenser 13, a reflux drum 14, a reflux line 15, a bottoms line 16, a reboiler 18 and a reboiler vapor line 19. The distillate product is withdrawn from the distillation system through line 21 and the bottoms product from the system through line 17. The pressure upon the system for the treatment of the specific composition given is maintained about 25 lbs. per sq. in. (gauge), in order to be able to employ ordinary water for cooling purposes in the condenser 13. The degree of separation in tower 10 is controlled by the heat supply from the reboiler 18 and the ratio of reflux supplied through line 15. The percentage of the feed taken off as product through line 21 is adjusted so as to take the major portion of the isoprene in this fraction while rejecting most of the piperylene and pentenes in the residue. In the example used for illustration, a reflux ratio of 5 is maintained while taking off approximately 19% of the feed as distillate product. Under these conditions, the temperature at the top of the tower is 141° F., while the temperature at the exit of the line 16 is about 270° F.

The overhead product removed through line 12 consists of a very narrow C$_5$ fraction containing the majority of the isoprene and some of the piperylene in the mixture, pentene-1 and other C$_5$ olefins and paraffins. The entire distillate is condensed in equipment 13 and passed to the drum 14. From the drum 14, a quantity of reflux is passed through line 15 in order to maintain the desired operating conditions. The remainder of the condensed distillate is withdrawn from the drum 14 and passed through line 21 for further processing. The ratio of the reflux to product is between 5 to 8, depending on the feed. In the processing of the feed stock of the specific illustration, the composition of the distillate material under the specific operating conditions given shows the following molar percentage composition:

| | |
|---|---|
| C$_4$ | 2.6 |
| 3-methyl butene-1 | 2.6 |
| Pentene-1 | 49.9 |
| 2-methyl butene-1 | 10.4 |
| Isoprene | 19.9 |
| Trans pentene-2 | 2.1 |
| n-pentane | 5.8 |
| Cis pentene-2 | 2.9 |
| 2-methyl butene-2 | 2.9 |
| Cyclopentadiene | 0.6 |
| Cis and trans piperylene | 0.3 |

The residual material consisting of most of the piperylene, some isoprene, normal pentane and some pentenes, in addition to higher boiling hydrocarbons, is withdrawn through line 16. A portion of the residue is passed through the reboiler 18 where it is vaporized in order to supply the heat necessary to operate the tower, the vapor being returned to the tower 10 through line 19. The remainder of the higher boiling material is removed from the system through line 17.

The overhead fraction from tower 10 as removed through line 21 is passed to the fractionating tower 20. The tower 20 is similar in design to tower 10 and may be any type of suitable fractionating equipment. It is furnished with an overhead vapor line 22, a condenser 23, a reflux drum 24, a reflux line 25, a bottoms line 26, a reboiler 28 and a reboiler vapor line 29. The tower also has a solvent line 39, a side stream vapor line 31 and a side stream return line 36. The distillate product is withdrawn from the system through line 41 and the bottoms product through line 27. Pressure upon the system is maintained at about 25 lbs. per sq. in. (gauge), in order to have a workable condensing temperature similar to that prevailing in the fractionating equipment 10.

The overhead distillate vapor removed through line 22 consists of azeotropic mixtures of C$_5$ olefins and paraffins when aqueous acetone is employed as the solvent material admitted through line 39. The vapors are condensed in equipment 23 and passed to the reflux drum 24. A portion of the condensate is returned through line 25 as reflux, while the remainder is withdrawn through line 41, cooled in equipment 42 and conducted through line 43 to the water scrubbing equipment 50.

The quantity of aqueous acetone admitted through line 39 to the distillation system is for the specific composition of feed stock in a volume ratio of solvent to hydrocarbon mixture of 2-1 from the point of introduction to the plate upon which the side stream is withdrawn. Below the plate from which the side stream product is withdrawn, the solvent is stripped of its hydrocarbon content.

The bottoms withdrawn through line 26 consists of relatively pure solvent. A portion of the bottoms liquid is passed through the reboiler 28 where it is vaporized, the vapors being returned to the tower 20 through the vapor line 29, to supply the heat necessary to operate the tower. The remainder of the solvent, except for a small portion withdrawn for purification, as to be further described, is conducted through line 27 to cooler 38 and then through line 39 to the upper portion of the tower 20. Thus, the major part of the solvent continuously recycles within the extractive distillation system.

The vapor side stream removed through line 31 contains a high concentration of isoprene with small amounts of other diolefins in the presence of solvent in an amount in equilibrium with a 75 molar percent concentration of solvent on the plates of the extractive distillation tower 20. The volume of the solvent is about 50% of the vapor mixture. This side stream material withdrawn through line 31 is conducted to the base of the side stream concentrating tower 30. The tower 30 may be any suitable fractionating apparatus, such as a tower provided with bubble plates, as previously employed. The tower is provided with an overhead vapor line 32, a condenser 33, a reflux drum 34, a reflux line 35 and a bottoms line 36, in addition to the vapor inlet line 31. The vapor entering the tower 30 through line 31 supplies the heat necessary to operate the tower.

The overhead distillate removed through line 32 consists essentially of azeotropic mixtures of isoprene, acetone and water and contains in addition small quantities of piperylene, cyclopentadiene and higher boiling materials such as polymers formed during the extractive distillation operation. The vapor is condensed in equipment 33 and conducted to the drum 34. A portion of the condensate is returned to the tower 30 through line 35 as reflux, while the remainder is withdrawn through line 37 to the water scrubbing equipment 40.

The degree of separation of the hydrocarbons taking place in the extractive distillation system 20 is dependent on two functions, namely, the ratio of the solvent to hydrocarbon liquid on the plates and the ratio of liquid to vapor flowing through the tower. The ratio of solvent to hydrocarbon is controlled by the rate of solvent recirculation. The ratio of liquid to vapor in the zone of high solvent to hydrocarbon ratio, that is, between the solvent inlet and the side stream outlet, is controlled by the reflux returned through line 25 from the reflux drum 24. Due to considerable difference in solvent concentration between the top of the tower and the extractive distillation zone and the difference in latent heats of the constituents, the reflux ratio and consequently the ratio of liquid to vapor at the top of the tower must be appreciably higher than the liquid to vapor ratio in the extractive distillation zone.

In the case of the specific example, the liquid to vapor ratio in the extractive distillation zone is 0.80, while the ratio at the top of the tower is 0.85, the latter being equivalent to a reflux ratio of 5.5. The reflux ratio used in the side stream tower 30 is adjusted so as to obtain an overhead product consisting essentially of the azeotropic mixture of isoprene, acetone and water and to supply adequate reflux to the solvent stripping section of the tower 20. Whichever requires the larger amount of reflux determines the reflux ratio at the top of the tower 30. In the case cited in the example, a reflux ratio of 20 is maintained at the top of the tower 30, in order to supply adequate reflux to the bottoms solvent stripping section of the tower 20.

The heat necessary for the extractive distillation operation, as well as to concentrate the hydrocarbon fractions and to strip the solvent, is supplied completely from the single reboiler 28. In this manner, considerable heat economy is effected, since the heat to operate the extractive distillation zone in tower 20 and the diolefin concentrating side stream tower 30 are supplied by condensation of solvent at the top of the solvent stripping section of the tower. If this were not done, a condenser would have to be provided for the solvent stripper to supply the reflux necessary for operation, and additional heat would be required to operate the extractive distillation system and to effect the side stream concentration. In the same way, the condensation needed to produce the required reflux in the extractive distillation zone is obtained by supplying the heat needed to concentrate the mono-olefins at the top of the tower 20.

In the operation of the system comprising towers 20 and 30 and their auxiliaries, separation into the zones indicated above is clearly defined by the various temperature zones. Thus, the vapor leaving the top of the tower 20 is at 140° F. The temperature rises sharply to 155° F. between the top of the tower and the plate on which the solvent is admitted through line 39, then very slowly reaching to 160° F. at the plate where the side stream is withdrawn through line 31. Below the plate from which the side stream is removed and as a result of the concentration of the aqueous acetone, the temperature rises sharply to 208° F. the temperature prevailing at the bottom of the tower. The temperature at the top of the side stream tower 30 is 145° F. In tower 30, the same type of temperature gradient is shown as in the concentrating section of the tower 20.

The isoprene-acetone-water azeotropic mixture removed as distillate from the tower 30 through line 37 is conducted to the water scrubbing equipment 40. Equipment 40 may be any suitable type of a liquid-liquid contacting device, in which countercurrent flow of the materials may be maintained. In the present case, the tower is packed with Raschig rings and sufficient pressure is maintained on the tower to prevent vaporization of any of the materials passing through it. The stream removed from the system through line 37 is admitted to the bottom of the tower 40 through a distributing device and then allowed to flow upward countercurrent to a stream of water admitted to the tower through line 44.

In passing through the tower, the acetone is removed and the hydrocarbon is thus completely freed of the solvent employed in the extractive distillation. The quantity of water employed is determined by the partition of the solvent between the hydrocarbon and the water and the efficiency of the extracting equipment 40. For the specific composition chosen, a volume ratio of water to distillate is approximately 1. Passing overhead from the tower 40 is partially purified isoprene in a high concentration. Impurities present in the stream consist of piperylene, cyclopentadiene, polymers and any other water insoluble materials contained in the distillate from the tower 30. The water extract removed from the tower through line 48 consists of a dilute solution of acetone in water. This extract is combined with a similar extract from the tower 50 and treated for the recovery of the acetone solvent as to be subsequently described.

The solvent-free diolefin concentrate from the tower 40 is conducted through line 46 to the fractionating tower 70. This tower may be any suitable device for effecting a fractional distillation. For the specific composition chosen, a tower containing 50 bubble cap plates is employed. The tower 70 is provided with an overhead vapor line 72, a condenser 73, a reflux drum 74, a reflux line 75 and a bottoms withdrawal line 76, a reboiler 78 and a reboiler vapor return line 79. The distillate product is withdrawn through line 81 and the bottoms product through line 77. Pressure is maintained on the system so as to effect satisfactory condensation with ordinary water in the condenser 73. In the specific example, pressure maintained upon the tower 70 is between 12 and 15 lbs. per sq. in. (gauge).

The distillate withdrawn through line 72 consists of highly purified isoprene containing traces of piperylene and pentenes. The distillate is condensed in equipment 73 and the condensate conducted to the reflux drum 74. A portion of condensate is returned to the tower 70 as reflux through line 75, while the remainder is withdrawn as product through line 81. It is cooled in equipment 18 and transferred to storage through line 82.

The bottoms consisting of the piperylene and cyclopentadiene, in addition to any polymer or high boiling constituents of the feed to the tower and containing some isoprene, is withdrawn through line 76. A portion of the material is passed to the reboiler 78 where it is vaporized, the vapors being returned to the tower 70 through line 79 to supply the heat necessary to operate the tower. The remainder of the bottoms are removed through the line 77 and recycled to the feed tower 10 for the recovery of any isoprene content.

By increasing the number of plates in tower 70 or increasing the reflux ratio, all of the isoprene may be taken overhead as purified product. It has been found, however, more efficient to reject a small amount of isoprene to the bottoms and recycle same for recovery as described. A reflux ratio of 12 is maintained for the desired separation in the tower 70.

The distillate fraction from the tower 20 which is withdrawn through line 41, containing the azeotropic mixtures of the C5 paraffins and olefins is combined with any recycled solvent from the bottom of the tower 20 taken from line 27 which is withdrawn through line 43 to maintain the impurities in the solvent at a low value. In the example, about 5% of the solvent passing through line 27 is withdrawn and combined with the distillate material removed through line 41. The composite solution is then cooled in equipment 42 and carried to the water extraction tower 50 by means of the line 43. The extraction tower 50 is similar to the extraction tower 40. It is similarly packed with Raschig rings. The composite solution consisting of the C5 olefins and paraffins, in addition to acetone and water, is introduced into the tower 50 near the bottom and passes upward through the tower countercurrently to a stream of water introduced near the top through line 45.

In passing through the tower, the solvent is extracted from the hydrocarbon material. Any polymers or other high boiling material in the portion of the recycled solvent which was combined with the distillate from tower 20 is extracted by the hydrocarbons of the distillate material. The hydrocarbons freed of solvent are removed through line 47 at the top of the tower 50 and discarded. The water extract consisting of a dilute solution of acetone in water is withdrawn through line 49 at the bottom of the tower 50 and after being combined with a similar extract from the tower 40 is transferred through line 51, through heat exchangers 52 and line 61 to the solvent recovery tower 60.

Tower 60 may be any convenient device for effecting fractional distillation, such as a tower containing about 20 bubble cap plates. It is provided with an overhead vapor line 62, a condenser 63, a reflux drum 64, reflux line 65, a bottoms withdrawal line 66 and a steam line 68. The distillate product is withdrawn through line 69 and the bottoms through line 67. The distillate from the tower 60 consists of relatively pure solvent. The tower is operated at about atmospheric pressure. The distillate vapor passes through line 62 to the condenser 63 and the condensate passed to reflux drum 64. A portion of the condensate returned to the tower 60 through line 65, while the remainder is withdrawn and transferred through line 69 to line 39 where it combines with the solvent admitted to the tower 20. Heat is supplied to the tower 60 by means of a steam line 68 through which open steam is injected directly into the bottom of the tower. The bottoms comprising the major part of the water content of the feed and the condensed steam is withdrawn through line 66 to the heat exchanger 52. The heat exchanger 52 is also utilized to heat the feed to the tower 60. Thus, the sensible heat of the bottoms is utilized.

The reflux returned to the tower 60 through line 65 is controlled at such a rate that the water content of the distillate passing through line 62 and consequently the product returned to the tower 30 through lines 69 and 39 is the same as the recycled solvent in tower 20. By proper adjustment of the reflux ratio in tower 60, the water content of the product may be varied to correct the variations in the water content of the solvent in the tower 20. Normally a reflux ratio of about 0.5 is maintained in the tower 60.

With the foregoing disclosure and illustration of the invention it will be obvious to those skilled in the art that various combinations and variations of the applications of the principles described and illustrated can be made without departing from the inventive concept.

What is claimed is:

1. An improved process for the separation of isoprene of high purity from a hydrocarbon fraction rich in various C5 hydrocarbons, both mono-olefins and diolefins, including isoprene, 2-methylbutene-2, cyclopentadiene, straight chain C5 dienes and cyclopentene, which comprises at least two distillation stages each conducted in a separate fractionating tower, one of said distillation stages being effected in the absence of a volatility modifier wherein reflux ratio and number of contact stages are interadjusted to effect separation between a distillate fraction containing isoprene, 2-methyl-butene-1, pentene-1, 2-methylbutene-2 and substantially free of cyclopentene, and a second fraction containing cyclopentadiene, straight chain C5 dienes and cyclopentene; and the other distillation stage being conducted on said distillate fraction containing isoprene and in the presence of acetone introduced substantially above the point of hydrocarbon feed supply in an amount sufficient to maintain about two volumes of acetone per volume of hydrocarbon in the liquid phase present above the feed plate in the distillation zone in which the hydrocarbon fractionation is being effected, with hydrocarbon reflux ratio, solvent to hydrocarbon ratio and number of contact stages inter-adjusted to effect substantially complete separation of isoprene from the $C_5$ olefins in the said isoprene-containing fraction including 2-methylbutene-1, pentene-1 and 2-methyl-butene-2, separating the isoprene from the acetone and recycling the acetone to said distillation zone above the hydrocarbon feed supply.

2. An improved process for the separation of isoprene of high purity from a hydrocarbon fraction rich in various $C_5$ hydrocarbons, both mono-olefins and diolefins, including isoprene, 2-methylbutene-2, cyclopentadiene, straight chain $C_5$ dienes and cyclopentene, which comprises at least two distillation stages each conducted in a separate fractionating tower, one of said distillation stages being effected in the absence of a volatility modifier wherein reflux ratio and number of contact stages are interadjusted to effect separation between a distillate fraction containing isoprene, 2-methyl-butene-1, pentene-1, 2-methylbutene-2 and substantially free of cyclopentene, and a second fraction containing cyclopentadiene, straight chain $C_5$ dienes and cyclopentene; and the other distillation stage being conducted on said distillate fraction containing isoprene and in the presence of a volatility modifying solvent selected from the class consisting of acetone and furfural, introduced substantially above the point of hydrocarbon feed supply in an amount sufficient to maintain a large proportion of at least two volumes of said solvent per volume of hydrocarbon in the liquid phase present above the feed plate in the distillation zone in which the hydrocarbon fractionation is being effected, with hydrocarbon reflux ratio, solvent to hydrocarbon ratio and number of contact stages interadjusted to effect substantially complete separation of isoprene from the $C_5$ olefins in the said isoprene-containing fraction including 2-methylbutene-1, pentene-1 and 2-methylbutene-2, separating the isoprene from the solvent and recycling the solvent to said distillation zone above the hydrocarbon feed supply.

JOHN A. PATTERSON.
HAROLD W. SCHEELINE.

REFERENCES CITED

The following references are of record in the file of this patent:

UNITED STATES PATENTS

| Number | Name | Date |
| --- | --- | --- |
| 2,288,126 | Dunn et al. | June 30, 1942 |
| 1,948,777 | Young | Feb. 27, 1934 |
| 2,113,965 | Roelfsema | Apr. 12, 1938 |
| 2,085,546 | Roelfsema | June 24, 1937 |
| 2,168,691 | Voorhees | Aug. 8, 1939 |
| 1,882,978 | Schmidt et al. | Oct. 18, 1932 |
| 1,938,083 | Mueller-Conradi | Dec. 5, 1933 |
| 2,186,524 | Frey | Jan. 9, 1940 |
| 2,325,379 | Durrum | July 27, 1943 |
| 2,290,636 | Deanesly | July 21, 1942 |
| 2,372,941 | Evans et al. | Apr. 3, 1945 |
| 2,371,908 | Morris et al. | Mar. 20, 1945 |
| 2,371,342 | Mayfield | Mar. 13, 1945 |
| 2,377,049 | Souders | May 29, 1945 |
| 2,379,110 | Souders | June 26, 1945 |

FOREIGN PATENTS

| Number | Country | Date |
| --- | --- | --- |
| 324,350 | Great Britain | Jan. 20, 1930 |

OTHER REFERENCES

Chemical Abstracts, vol. 29, page 6034 (1935). Copy in Scientific Library.